United States Patent [19]
Bartz

[11] Patent Number: 5,269,356
[45] Date of Patent: Dec. 14, 1993

[54] DEVICE FOR CUTTING MATING SURFACES FOR MITERED JOINTS

[76] Inventor: William R. Bartz, 854 Arbor Oaks Dr., Vacaville, Calif. 95687

[21] Appl. No.: 852,792

[22] Filed: Mar. 17, 1992

[51] Int. Cl.$^5$ .............................................. B27B 25/10
[52] U.S. Cl. ................................ 144/345; 83/437; 83/468.7; 83/477.2; 83/581; 144/355
[58] Field of Search ............. 83/421, 425, 435.1, 83/437, 468.7, 477.2, 581, 419, 13; 33/430, 474, 479, 480; 144/216, 345, 346, 353, 372, 375, 355

[56] References Cited

U.S. PATENT DOCUMENTS

| | | | |
|---|---|---|---|
| 2,968,325 | 1/1961 | Wandvik | 83/437 |
| 4,165,668 | 8/1979 | McCord, Jr. | 83/437 X |
| 4,454,793 | 6/1984 | Strong | 83/421 |
| 4,651,606 | 3/1987 | Hurwitz | 83/437 |
| 5,042,346 | 8/1991 | McCann | 83/437 X |

Primary Examiner—Eugenia Jones

[57] ABSTRACT

A system for constructing mitered corners on a table saw having a rotatable adjustable miter guide slidable in a groove on either side of a saw blade comprises a presentation device having two surfaces meeting at a fixed angle. Any error in setting the angle of the miter device is canceled by placing the presentation device between the first piece to be cut and the miter guide while cutting the first piece, then moving the miter guide to the opposite groove without resetting the miter angle and reversing the presentation device between the second piece to be cut and the miter guide. In a preferred embodiment the presentation device has an engagement mechanism for engaging the miter guide and an adjustable slide stop for determining the cut length of a piece of material.

8 Claims, 6 Drawing Sheets

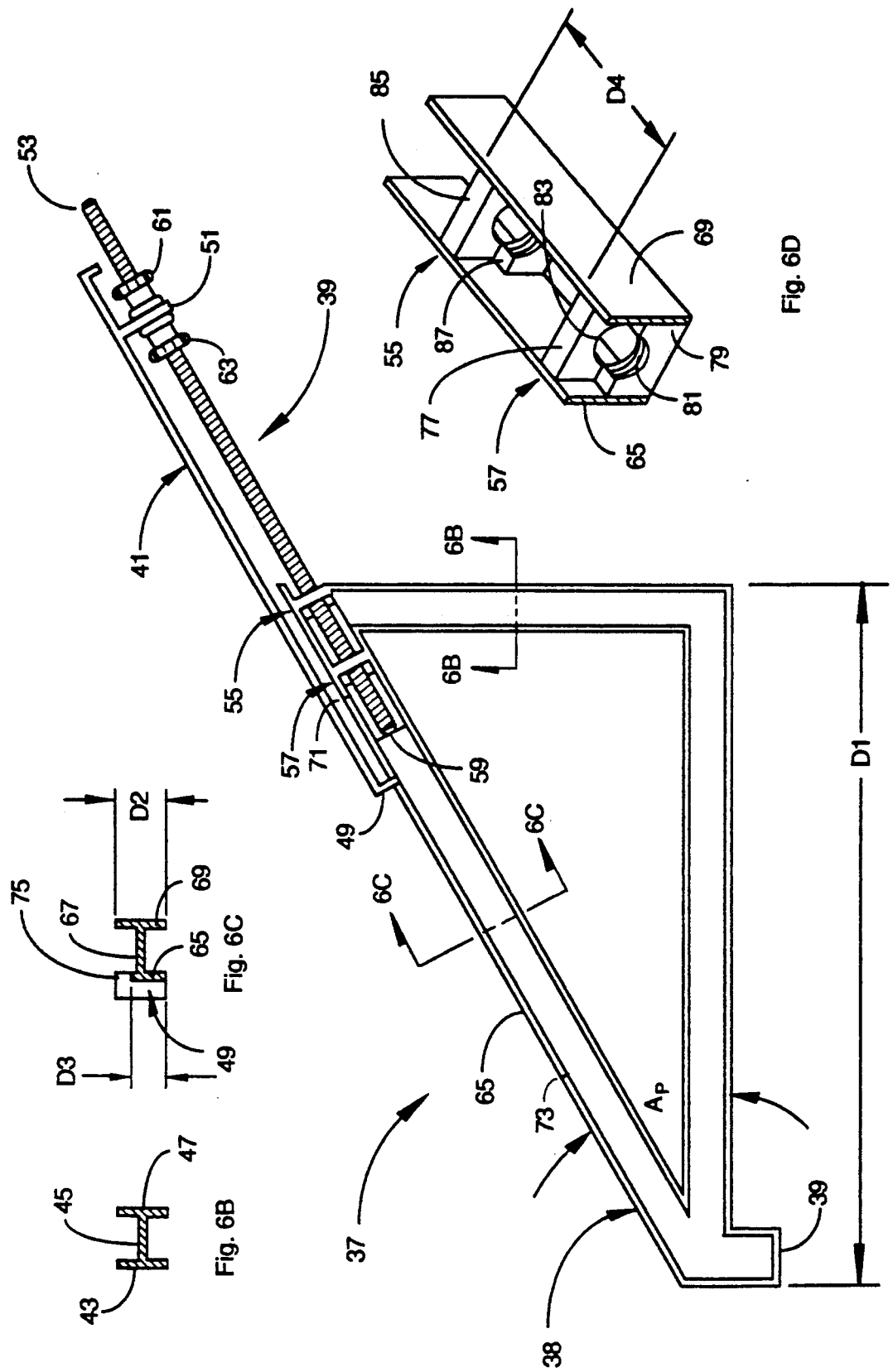

DEVICE FOR CUTTING MATING SURFACES FOR MITERED JOINTS

FIELD OF THE INVENTION

The present invention is in the area of apparatus and methods for shaping materials to be joined at selected angles, and in a preferred embodiment relates in particular to guiding saw cuts for making mitered joints.

BACKGROUND OF THE INVENTION

When shaping two pieces of material to be joined at a selected angle, there is always a significant problem in providing an angle on each piece such that the two angles will join to form the selected angle. Cutting pieces of wood with a miter guide on a table saw to form mating surfaces on separate pieces to make a frame, such as a picture frame, is an example.

A common operation on a conventional table saw involves cutting a 45 degree angles on two separate pieces of framing material, and subsequently joining the separate pieces, making a 90 degree corner.

FIG. 1 shows a plan view of a conventional table saw 11 having two parallel grooves 13 and 15 for restraining a miter guide 17 to be moved in the direction of the groove. Miter guide 17 has a rotatably adjustable guide element 20 with a support surface 10 for setting the angle by which a piece to be cut is presented to the cutting element, in this case saw blade 23. Adjustable element 20 is pivoted on bar 18, which is configured to slide in groove 13. A hand-operated clamp nut assembly 19 also attaches to bar 18 at a different point than the pivot. By loosening clamp nut 19, rotating element 20, and tightening the nut, a user can adjust the miter to change the angle of the cut. In this description, the miter is shown set to a nominal 45 degree angle, with a frame piece 21 against surface 10.

By sliding the miter guide along groove 13 while holding frame piece 21 against surface 10, the frame piece is brought to saw blade 23, and a cut is made through the frame piece along dotted line 25, such that angle $A_1$ equals angle $A_2$, nominally 45 degrees in this example.

The typical procedure to shape a mating piece for joining, after cutting a first piece with the miter guide in groove 13, is to move the miter guide to groove 15, and readjust it, to cut the second piece. Guide 17 is shown in groove 15 in FIG. 1 by dotted outline. In the dotted outline the miter is shown readjusted to provide an angle of nominally 45 degrees ($A_3$), such that when the miter is moved along groove 15 the saw blade cuts through frame piece 27 along dotted line 29, providing angle ($A_4$) equal to angle ($A_3$).

A problem in the conventional method is in the possibly imprecise setting of the angle of the miter, which may be compounded by resetting the miter for cutting the second piece. The common miter guide is not a precision device, and relies on a visual scale. Accordingly, it is quite difficult to set the angle for the miter precisely.

If, in the operation described, angle $A_1$, hence angle $A_2$, is not precisely 45 degrees, or angle $A_3$, hence angle $A_4$, is not precisely 45 degrees, or both, then the two pieces prepared cannot be joined to form a "tight" corner of precisely 90 degrees.

One might, as a hedge against resetting the miter as described above, leave the miter on the first side of the saw blade, and cut the second piece by turning it upside down and cutting it just as shown for cutting the first piece. The problem in this instance is that if angle $A_1$ is, for example, less than 45 degrees, such as 44 degrees, then the angle for the second piece will also be 44 degrees, and the pieces would join at 88 degrees. The errors add. If the first angle is greater than 45 degrees, the second angle will also be greater by the same amount, and the resultant joined angle will be greater than 90 degrees by double the error for the individual pieces.

What is clearly needed is a device for ensuring that the angle cut on a second piece corrects any error in the angle cut on a first piece, to produce the desired total angle for the joint to be formed. For example, in the case of a desired corner of 90 degrees, if the angle cut on the first piece is 44 degrees, the angle cut on the second will be 46 degrees without having to readjust the miter.

SUMMARY OF THE INVENTION

In a preferred embodiment of the invention a presentation device is provided for use with a cutting system having a table, a cutting element, and a guide with a support surface at a right angle with the plane of the table. The presentation device comprises a first surface for placing against the support surface of the guide and a second surface for positioning a piece to be cut at a selected angle relative to the cutting direction of the cutting element. The second surface of the presentation device is at a fixed presentation angle with the first surface. The presentation device claimed is particularly useful with a table saw having a saw blade with a rotatably adjustable miter guide slidable in grooves on either side of the saw blade.

In alternative embodiments the presentation device of the invention has a means of engaging the miter to avoid movement of a piece during cutting and an adjustable slide stop for determining the cut length of a piece of material presented to the cutting element with the presentation device.

A method is provided using the presentation device of the invention in conjunction with a table saw for joining two pieces of material at a selected angle. The miter is set in one groove in the table of the table saw and the presentation device is placed against the miter guide. Then a first piece to be cut is placed against the presentation device, the miter is moved along the groove, and a mating surface is cut on the first piece of material.

To cut a mating surface on a second piece of material, the miter guide is moved to the opposite table groove, the presentation device is reversed with the first surface held against the miter guide, and a second piece of material is placed against the presentation device. The miter guide is then moved along the groove, and a mating surface is cut on the second piece of material.

Moving the miter guide to the second groove in the table without changing the miter angle avoids any error in resetting the miter angle, and reversing the orientation of the presentation device compensates for any error in the original setting of the miter angle. For example, if the desired angle to be cut is 45 degrees for a 90 degree corner, and the actual angle cut is 44 degrees, the presentation device and the method assure that the angle cut on the second piece is 46 degrees, so the sum of the cut angles remains 90 degrees, regardless of the original error.

The presentation device is usable as well with a radial arm saw, and with other cutting systems, and provides for tight mitered corners of precisely the selected angle, without resorting to expensive gauges and alignment devices.

BRIEF DESCRIPTION OF THE DRAWINGS

FIG. 6A is a plan view of a presentation device according to the invention in an alternative embodiment.

FIG. 6B is a section view through one portion of the device of FIG. 6A.

FIG. 6C is a section view through another portion of the device of FIG. 6A.

FIG. 6D is an isometric view of a portion of the device of FIG. 6A showing molded threads for engaging a threaded rod.

DESCRIPTION OF THE PREFERRED EMBODIMENTS

Figure 1:
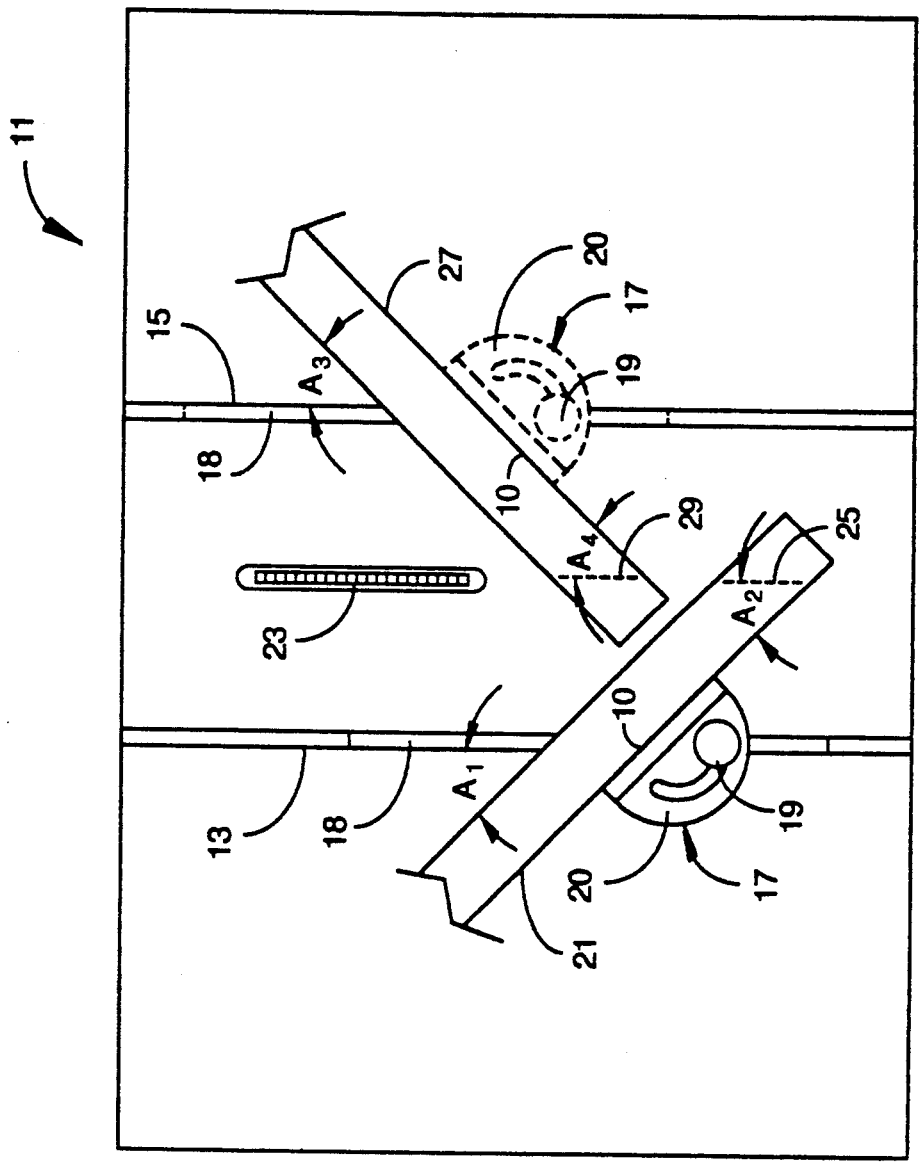
FIG. 1 is a plan view of a table saw with a rotatably adjustable miter guide, according to the prior art.
Figure 2:
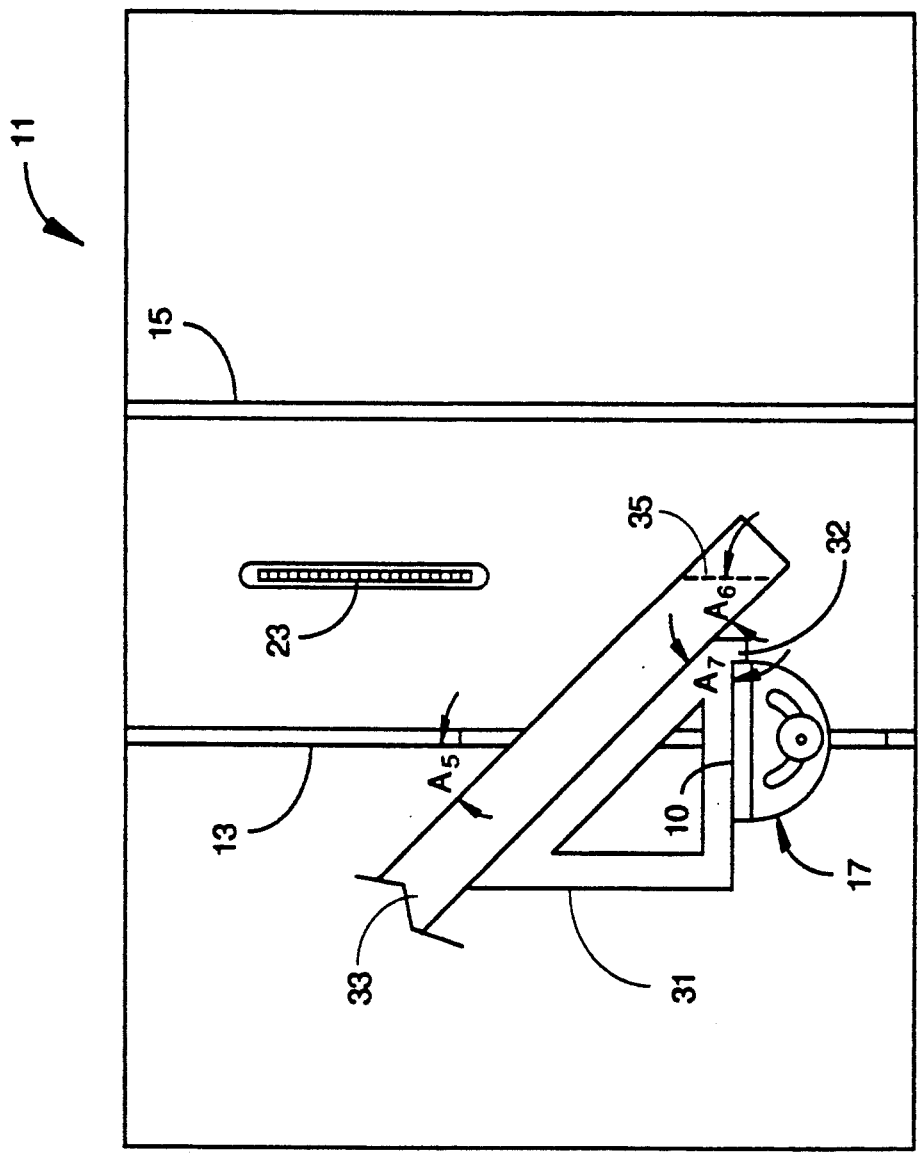
FIG. 2 is a plan view of a table saw according to the present invention for cutting a mating surface on a first piece.

FIG. 2 shows table saw 11 with a presentation device 31 according to the present invention, engaged with a conventional miter device 17 having a support surface 10. The miter device is guided in groove 13 and used to position a first frame piece 33 to cut an angle for joining to a second piece not shown in FIG. 2. In FIG. 2, miter 17 is set so support surface 10 is oriented nominally 90 degrees with the direction of grooves 13 and 15. Device 31 is molded from high impact plastic, and has an angle $A_7$ of 45 degrees for this example. Device 31 in this embodiment also has a "foot" extension 32, provided to engage an edge of the rotatable element of the miter so pressure applied by the sawblade will not tend to displace the device or cause it to slide along surface 10. The molded foot is a convenient means of engagement to the miter table. For purposes of description, the angle $A_7$ hereinafter called the presentation angle.

Since it is very difficult to set the miter angle to exactly 90 degrees relative to the groove, for the purpose of this example miter 17 is assumed to be off by 1 degree counterclockwise, making angle $A_5$ 46 degrees. By sliding miter 17 in groove 13, the saw blade makes a cut along dotted line 35 such that angle $A_6$ is also 46 degrees, the same as angle $A_5$. Angle $A_5$ and angle $A_6$ may be shown to be equal by the principles of plane geometry.

Figure 3:
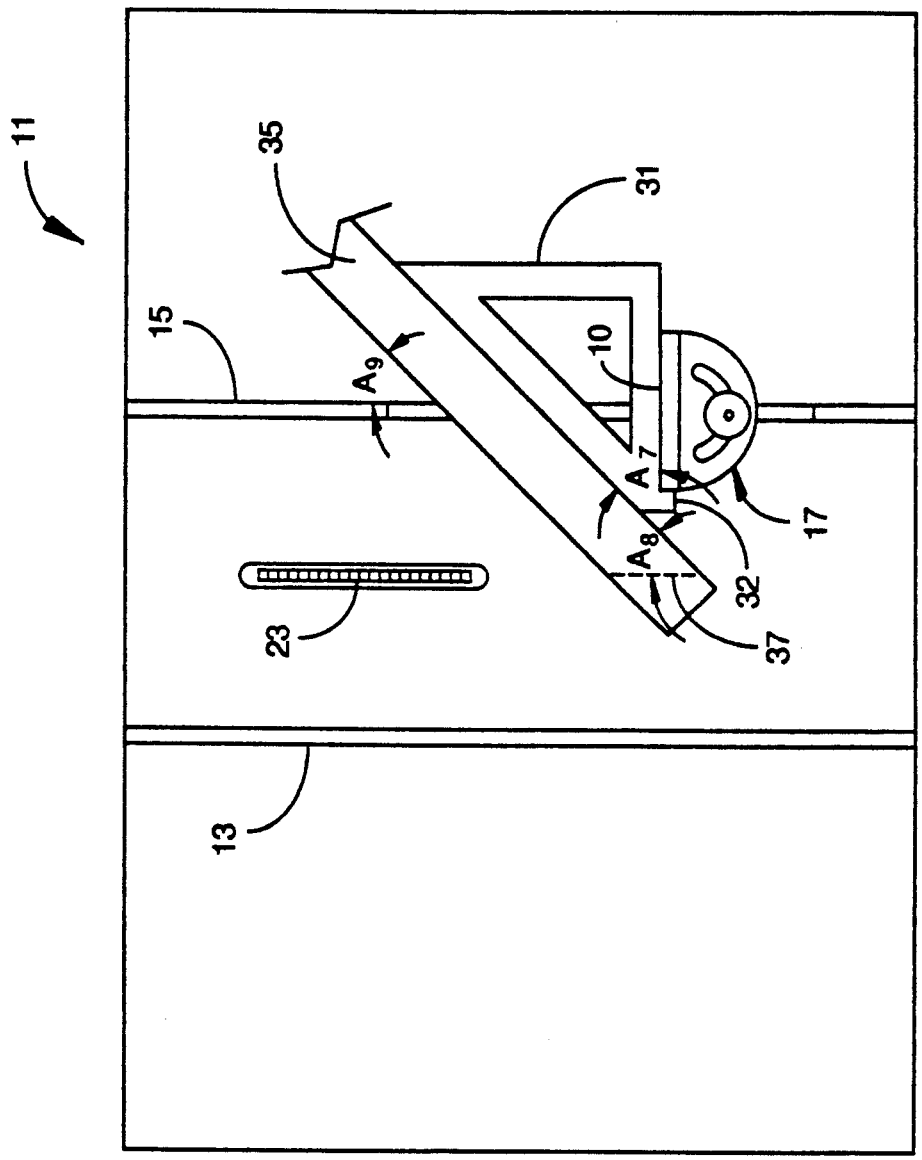
FIG. 3 is a plan view of the table saw of FIG. 2 for cutting a mating surface on a second piece.

FIG. 3 is a plan view of table saw 11 after cutting first piece 33 according to FIG. 2. In FIG. 3, miter 17 has been moved to groove 15 without resetting the miter, which is therefore still rotated so surface 10 is still 1 degree counterclockwise from horizontal. Device 31 is "flipped over" horizontally, with angle $A_7$ (45 degrees) still at the edge of the miter table closer to the sawblade. Since the miter is still set as in FIG. 2, that is, with surface 10 1 degree counterclockwise from horizontal, angle $A_9$ is 44 degrees.

With a second frame piece 35 held in place against surface 10, miter 17 is moved along groove 15, and the saw blade cuts piece 35 along dotted line 37, providing angle $A_8$ the same as angle $A_9$, that is 44 degrees.

In this example, two pieces have been cut, the first with an angle of 46 degrees, and the second with an angle of 44 degrees. When these two pieces are joined to make a corner, the corner angle will be the sum of the angles cut on each of the pieces, or precisely 90 degrees.

The use of device 31 of the invention, together with moving the miter to the guide groove on the opposite side of the saw blade and flipping device 31 180 degrees, as shown in FIG. 3, results in the second piece being cut on an angle such that any error in setting the miter angle, while subtracting from the angle cut on a first piece, adds the same amount to the angle cut on the second piece, if the device of the invention is used as described. The result being that when the two pieces are joined, any error in setting the miter angle is canceled.

Those skilled in the art of using mitre equipment will understand that as a practical matter for a closed polygon, all cuts of one kind are made before the complementary angles are cut. So for a square having an angle of 45 degrees on the ends of each piece as in the example above, all four sides will be cut first at one angle, and then the mitre will be moved to the other groove and the device flipped over for the cuts on the opposite ends of each piece.

Figure 4B:
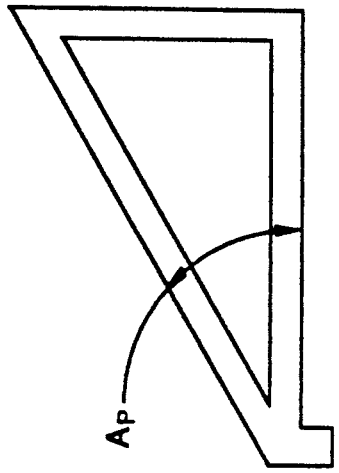
FIG. 4B shows a device according to the invention with a fixed angle of 30 degrees.
Figure 4C:
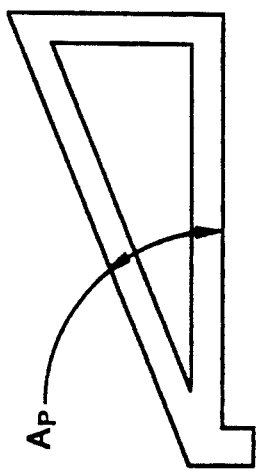
FIG. 4C shows a presentation device according to the present invention with a presentation angle of 22.5 degrees.
Figure 4A:
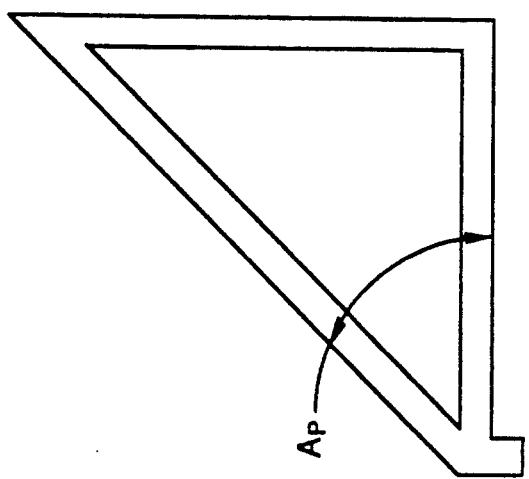
FIG. 4A shows a presentation device according to the present invention with a presentation angle of 45 degrees.

The presentation angle for device 31 need not be 45 degrees. FIG. 4A, 4B, and 4C show presentation devices according to the present invention with presentation angles $A_P$ of 45 degrees, 30 degrees, and 22.5 degrees respectively.

Figure 5B:
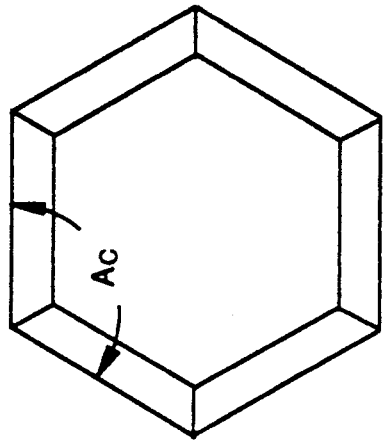
FIG. 5B shows a frame composed of pieces joined at a corner angle of 120 degrees.
Figure 5C:
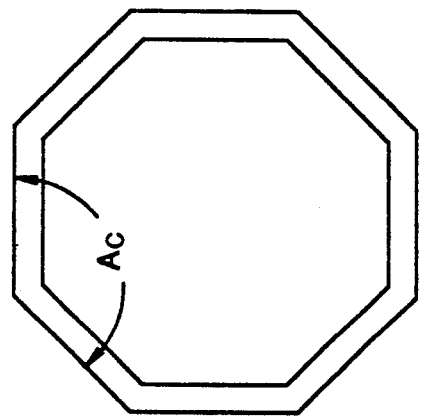
FIG. 5C shows a frame composed of pieces joined at a corner angle of 135 degrees.
Figure 5A:
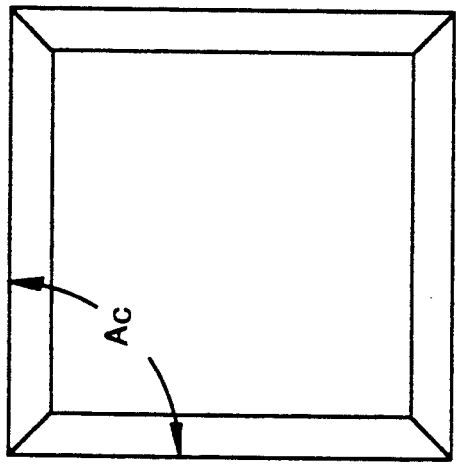
FIG. 5A shows a frame composed of pieces joined at a corner angle of 90 degrees.

FIG. 5A, 5B, and 5C show structures constructed from frame pieces having end angles cut on a table saw using a miter and a presentation device according to the present invention. In each of FIG. 5A, 5B, and 5C, one corner angle is indicated as $A_C$. All of the corner angles in any one of the FIGS. 5A, 5B, and 5C are substantially equal.

FIG. 5A shows a square construction in which the corners each form angles, such as angle $A_C$, of 90 degrees, twice the complement of the presentation angle of the presentation device of FIG. 4A. The complement of an angle being the difference between the angle and 90 degrees. The construction of FIG. 5A may be made using the presentation device of FIG. 4A and the method described above, and any error or discrepancy in the setting of the miter device will be compensated.

The six-sided construction of FIG. 5B has corner angles $A_C$ of 120 degrees, which is twice the complement of the presentation angle $A_P$ of the presentation device of FIG. 4B. The construction of FIG. 5B may be made with the device of FIG. 4B and the method described, compensating for any error or discrepancy in setting the miter device. Similarly, the construction of FIG. 5C may be made with the presentation device of FIG. 4C, providing corner angles of twice the complement of the presentation angle of the device of FIG. 4C.

FIG. 6A is a plan view showing a device 37 according to the invention comprising a triangular structure 38 with a foot element 39, preferably molded from a high impact plastic material, and an adjustable slide stop assembly 39 comprising a slide 41 for positioning a piece to be cut against the device. The slide stop feature provides for repeatability in length of frame pieces cut using the device of the invention.

Device 37 has a dimension D1 of about 15 cm. and a presentation angle $A_P$ of 30 degrees for the purpose of this example, but other sizes might be preferable in alternative embodiments, and the presentation angle could be any convenient angle, just as in examples above without an adjustable slide stop. Also, device 37 is constructed so it may be flipped over and used with the apex of the presentation angle pointing in the opposite direction to that shown in FIG. 6A.

FIG. 6B is a section view of one leg of device 37 taken along section line 6B—6B, showing an H-shaped cross section having an inside vertical portion 43, a middle portion 45, and an outside vertical portion 47.

Slide 41 (FIG. 6A) comprises a front surface 49 against which a piece to be cut is urged, and a dependent structure 51 having a clearance opening (not shown) for a threaded rod 53. Rod 53 is engaged in threaded structures 55 and 57 and urges against a surface 59 of molded structure 38. Threaded rod 53, firmly engaged in molded structure 38, passes through dependent structure 51 of slide 41, and two threaded nuts 61 and 63, one on each side of dependent structure 51, provide adjustment for the position of stop surface 49 along the hypotenuse side of structure 38.

FIG. 6C is a section view taken along section line 6C—6C of FIG. 6A, and shows the shape of stop surface 49 relative to structure 38. Structure 38 has the same H-shaped cross section on the hypotenuse side as shown in FIG. 6B, having an outside vertical portion 65, an inside vertical portion 69, and a middle portion 67. The overall height of the H-shape, D2, is about 1.6 cm.

Portion 65 is the side of the triangular structure against which stop surface 49 is positioned, and for the length of the side through which stop surface 49 may be positioned, the height of portion 65 is about 10 cm. (D3) instead of the full 15 cm. of other parts of the structure. This shorter height forms a recessed region from point 71 to point 73 (FIG. 6A). Stop surface 49 has a depending portion 75 which fits into the recessed region formed between points 71 and 73, accomplishing two purposes. The engagement of portion 75 helps to guide the slide and constrain its sideways movement, and also prevents any piece to be cut from encroaching under the slide between the slide and side 65.

FIG. 6D is an isometric view of a portion of the hypotenuse side of structure 38 in the area of threaded structures 55 and 57, magnified to better illustrate how threads are provided in structure 38 for engagement of threaded rod 53. In the length of side 65 where threaded rod 53 engages, there is no middle portion 67 to the structure. Surface 59, against which the threaded rod is urged in assembly, is the end of middle portion 67 on this side.

Threaded structure 57 comprises two offset bridge elements 77 and 79. Element 79 has a semicircular opening 81 with molded threads facing toward the center of the opening, and element 77 has a similar opening 83 with molded threads facing the opposite direction. Threaded structure 55, spaced apart from structure 57 by distance D4, in this embodiment about 2 cm., has two similarly offset bridge elements 85 and 87, also having molded threads.

Two threaded structures, each with offset bridge elements having molded threads provides a secure threaded engagement for threaded rod 53, and the structures and threads can be provided in molded structure 38 entirely in a single split-mold step, without any additional machining or tapping required.

It will be apparent to one with skill in the art that there are number of different ways that the present invention might be implemented without departing from the spirit and scope of the invention. For example, the foot designed as a part of the presentation device of the invention is not required for the invention, but is a unique feature that adds to its utility. The device could be used, and the method could be used, without the foot. The same is true of the adjustable slide stop. As another example, the presentation device could be made from a number of different materials, and could be implemented in a number of different ways, other than in molded plastic as described above.

It will also be apparent to one with skill in the art that there are a variety of ways that the device and the method of the invention might be used without limitation to the specific examples given, using a conventional table saw with a conventional miter guide. There are other shaping devices which might be used rather than a table saw, such as a milling machine, shapers, and a radial arm saw. In the case of a radial arm saw, an adjustable miter would be used without the guide for moving the miter along a groove relative to the saw blade. In this case, the saw blade is movable relative to the miter to accomplish a cut, but the invention works substantially as described with the exception that the saw is moved rather than the workpiece.

The device and method of the invention is applicable to many situations of shaping construction pieces, wherein a similar guide might be used, with either the cutting means or the guide means being movable.

What is claimed is:

1. A presentation device for use with a cutting system having a table, a cutting element, and a guide means comprising a support surface forming substantially a right angle with the plane of the table, said guide means having a first end forming a first corner with said support surface and a second end forming a second corner with said support surface, said presentation device comprising:

a first surface for placing against said support surface; and a second surface for positioning a piece to be cut at a selected angle relative to the cutting direction of said cutting element;

said second surface being at a fixed angle with said first surface;

engagement means for engaging said first surface with said support surface, said engagement means comprising a foot element depending from said first surface, said foot element for engaging one of said corners to oppose sliding movement between said first surface and said support surface.

2. A presentation device as in claim 1 further comprising an adjustable stop means comprising a stop surface positionable along said second surface, said adjustable stop means for opposing sliding movement between said piece to be cut and said second surface.

3. A presentation device as in claim 2 wherein said adjustable stop means comprises a slide having said stop surface on one end and an engagement element depending from the slide, said engagement element having a clearance opening engaging a threaded rod with adjusting nuts on opposite sides of said engagement element.

4. A presentation device for use with a cutting system having a table, a cutting element, and a guide means comprising a support surface forming substantially a right angle with the plane of the table, said presentation device comprising:
   a first surface for placing against said support surface; and
   a second surface for positioning a piece to be cut at a selected angle relative to the cutting direction of said cutting element;
   said second surface being at a fixed angle with said first surface;
   engagement means for engaging said first surface with said support surface;
   adjustable stop means comprising a stop surface positionable along said second surface, said adjustable stop means for opposing sliding movement between said piece to be cut and said second surface;
   wherein said adjustable stop means comprises a slide having said stop surface on one end and an engagement element depending from the slide, said engagement element having a clearance opening engaging a threaded rod with adjusting nuts on opposite sides of said engagement element.

5. A method for joining a first and a second piece of material at a selected angle using a table saw having a table, a saw blade, and a rotatably adjustable miter guide slidable in a first groove in said table on one side of the saw blade and a second groove in said table on the opposite side of the saw blade, said method comprising steps of:
   placing said miter guide in said first groove;
   adjusting the angle of said miter guide to a selected angle;
   placing a first edge surface of a presentation device against said miter guide with a first side of said presentation device against said table and the opposite side away from said table, said presentation device having a second edge surface at a fixed angle to said first edge surface;
   holding said first piece of material with a first lengthwise edge against said second surface of said presentation device;
   sliding said miter guide in said first groove to cut a first mating surface on said first piece of material;
   moving said miter guide to said second groove without readjusting the angle of said miter guide;
   placing said first edge surface of said presentation device against said miter guide with said presentation device turned over so a second side of said presentation device is against said table, said second side being opposite said first side;
   holding said second piece of material with a second lengthwise edge against said second surface;
   sliding said miter guide in said second groove to cut a second mating surface on said second piece of material; and
   joining said first and said second pieces of material along said first and said second mating surface.

6. The method of claim 5 wherein said presentation device comprises an engagement means associated with said first edge surface for engaging said miter guide, and said method comprises a step of engaging said miter guide with said engagement means to oppose sliding movement between said presentation device and said miter guide.

7. The method of claim 6 wherein said engagement means comprises a molded structure depending from said first surface creating an inside corner for engaging an outside corner on said miter guide.

8. The method of claim 5 wherein said presentation device comprises an adjustable stop means having a stop surface positionable along said second surface, said adjustable stop means for opposing sliding movement between said first piece of material and said presentation device and said second piece of material and said presentation device, and for determining the cut length of said first piece of material and said second piece of material, said method comprising a step for urging said first piece of material against said stop surface in conjunction with holding said first piece of material with a first lengthwise edge against said second surface, and a step for urging said second piece of material against said stop surface in conjunction with holding said second piece of material with a second lengthwise edge against said second surface.

* * * * *